Figure 1:
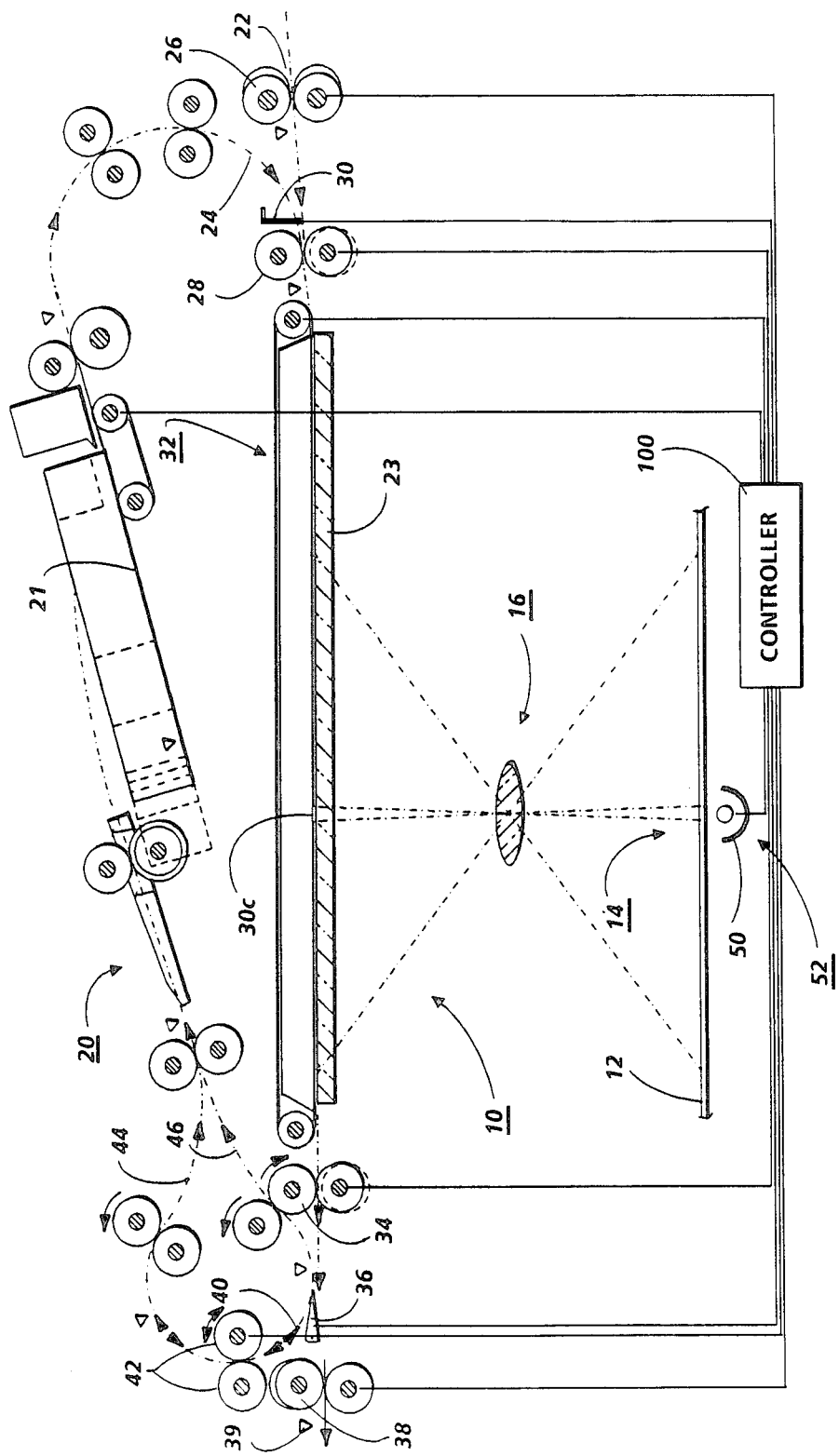

United States Patent [19]

Acquaviva et al.

[11] Patent Number: 4,731,637

[45] Date of Patent: Mar. 15, 1988

[54] AUTOMATIC "TWO-UP" DOCUMENT REGISTRATION AND FEEDING FOR COPIERS

[75] Inventors: Thomas Acquaviva, Penfield; Thomas R. Cross, Rochester, both of N.Y.

[73] Assignee: Xerox Corporation, Stamford, Conn.

[21] Appl. No.: 29,026

[22] Filed: Mar. 23, 1987

[51] Int. Cl.⁴ .......................... G03G 15/00; B65H 7/02
[52] U.S. Cl. ............................ 355/14 SH; 355/14 R; 355/24; 271/3.1; 271/226; 271/227
[58] Field of Search ............... 355/14 SH, 3 R, 14 R, 355/23, 24, 25; 271/3.1, 152, 226, 227, 238, 256

[56] References Cited

U.S. PATENT DOCUMENTS

| | | | |
|---|---|---|---|
| H21 | 2/1986 | Schieck | 355/14 SH |
| 3,288,459 | 11/1966 | Hitchcock et al. | 271/10 |
| 3,326,548 | 6/1967 | Wright | 271/53 |
| 3,402,628 | 9/1968 | Redding et al. | 83/434 |
| 3,635,555 | 1/1972 | Kurahashi et al. | 355/8 |
| 4,017,173 | 4/1977 | Komori et al. | 355/8 |
| 4,052,054 | 10/1977 | Cardwell et al. | 271/227 |
| 4,098,551 | 7/1978 | Komori et al. | 355/3 R |
| 4,218,130 | 8/1980 | Satomi et al. | 355/14 R |
| 4,235,431 | 11/1980 | Abrams et al. | 271/10 |
| 4,334,765 | 6/1982 | Clark | 355/14 SH |
| 4,453,819 | 6/1984 | Wada et al. | 355/3 SH |
| 4,456,237 | 6/1984 | Buddendeck | 271/3.1 |
| 4,508,447 | 4/1985 | Doery | 355/14 SH |
| 4,579,444 | 4/1986 | Pinckney et al. | 355/14 SH |
| 4,592,651 | 6/1986 | Oikawa et al. | 355/72 |
| 4,639,120 | 1/1987 | Matsuura | 355/14 R |
| 4,674,862 | 6/1987 | Abuyama | 355/14 SH |
| 4,674,866 | 6/1987 | Tanaka | 355/14 SH |

FOREIGN PATENT DOCUMENTS 60-2942 9/1985 Japan.

OTHER PUBLICATIONS

"Document Feeder Without Register Gates", Charles J. Mahler, Xerox Disclosure Journal, vol. 2, No. 3, May/Jun. 1977, p. 49.

"Document Registration System", Thomas N. Taylor, Xerox Disclosure Journal, vol. 3, No. 2, Mar./Apr. 1978, pp. 123-125.

1985 printed operator's manual for the Xerox Corporation "1090" copier, pp. 25-27.

*Primary Examiner*—A. C. Prescott

[57] ABSTRACT

In a document handling system for a copier, for sequentially feeding and registering document sheets to the imaging station, including a registration gate retractably insertable into the document feeding path to engage and register an edge of the document fed thereagainst; the registration gate has first and second registration sides spaced apart by a preset defined distance, the first edges of the documents are registered against one side of the registration gate while it is inserted into the document feeding path, and the document feeding and registering system then lifts the gate and feeds the document past the gate, and then reverses the direction of motion of selected documents to back their opposite edges into registration with the opposite (second) side of the gate in coordination with reinserting the gate into the document path and in coordination with also registering a first edge of the next-fed document against the first side of the gate, and then the gate is re-retracted and those two (or more) documents are fed to the imaging station for "two-up" copying with a registered spacing between them determined by the thickness of the gate.

9 Claims, 8 Drawing Figures

AUTOMATIC "TWO-UP" DOCUMENT REGISTRATION AND FEEDING FOR COPIERS

Cross-reference is made to commonly assigned U.S. application Ser. No. 912,014, filed Sept. 26, 1986 by Stephen R. Partilla & Ernest L. Dinatale, entitled "TWO-UP AUTOMATIC DOCUMENT FEEDER FOR SIMPLEX TO DUPLEX COPYING", and Ser. No. 944,693, filed Dec. 18, 1986 by Richard E. Smith, entitled "AUTOMATIC COPIER SIGNATURE SET PRODUCTION". They are also incorporated by reference herein.

This invention relates to copier document handling, and, more particularly, to automatic plural document registration and plural document presentation to the imaging station of a copier of individual documents to be copied. It is particularly suited for "two-up" copying.

"Two-up" copying means that two (or more) document sheets or pages are placed on the same imaging station at one time, normally for the copying of both onto a single copy sheet. The copy sheet can be cut into two sheets, or center-folded. If both sides are appropriately copied before folding, (usually with another document pair printed on the other side first), then "signature" sheets can be produced.

The term "two-up" as used herein is not intended to be limited to only two (one pair) of documents. The present system is also applicable to placing 3 or 4 or more documents on a platen at one time with the same registration and inter-document automatic spacing produced for two documents. This is particularly advantageous for automatically and sequentially copying plural small related business forms, post cards or the like, onto single copy sheets with proper positioning.

A signature is a sheet containing plural (usually 4) printed pages (two on each side) with a page arrangement such that when such sheets are center-folded and nested one inside of the other with other signature sheets in a set they become one collated pamphlet, booklet, or book; or a quire forming one section of a larger book. The booklet copies may be formed from center-folded sheets of paper each carrying four copy images of the original documents made in a known signature page sequence (i.e., a particular known non-directly-sequential placement of images on each signature sheet is essential to providing a finished folded signature set or booklet with a direct sequential page order).

One of the most difficult challenges constraining greater use of two-up copying copier art is the registration and placement of the conventional input documents, whether single page (simplex) or dual opposing page (duplex) documents. Most prior art two-up systems require manual document handling or are relatively complex and not easily understood or used by the typical casual copier operator. It is desirable therefore to provide a new and improved automatic document sheet handling technique for input documents, especially a "dual mode" document handling system which can provide for normal, individual document copying as well as proper "two-up" copying of two document pages.

It is not surprising that document pair copying, even though it is a desirable function or feature, is not commonly practiced on copiers except by experienced operators, and is very error prone. With manual document pair handling, one slip in any of the complicated process of document page variable orientation placement and spacing will result in unusable copies which must be destroyed, reregistered and recopied.

The present system allows and encourages casual operator signature printing or other "two-up" copying operations by eliminating the difficulty and complexity of proper manual page placements, page spacing and page orientation, etc., of the original document pairs.

The present system is usable with various document handlers, e.g., RDH, SADH, ADF and/or ADH systems, or plural mode units. Yet the present system does not significantly increase conventional document handling complexity or cost in compatibly achieving this additional function.

As xerographic and other copiers increase in speed, and become more automatic, it is increasingly important to provide higher speed yet more reliable and more automatic handling of the document sheets being copied, i.e. the input to the copier. It is desirable to feed, accurately register, and copy document sheets of a variety or mixture of sizes, types, weights, materials, conditions and susceptibility to damage, yet with minimal document jamming, wear or damage by the document transporting and registration apparatus, even if the same documents are automatically fed and registered repeatedly, as for recirculating document precollation copying.

Even with slower copying rate copiers, it has become increasingly desirable to provide at least semi-automatic document handling (SADH), allowing an operator to "stream feed" originals into an input of the copier document handler or feeder, or to provide an automatic document handler (ADH) for automatic feeding from a stack of documents, with the document feeder in either case doing the deskewing, feeding and final registration of the documents into the copying position, and then ejecting the documents from the platen automatically.

A preferable document handling system is one that utilizes an existing or generally conventional copier optical imaging system, including the external transparent copying window (known as the platen or imaging station) of the copier. It is also desirable that the document handling system be readily removable, as by pivoting away, to alternatively allow the copier operator to conventionally manually place documents, including books, on the same copying platen. Thus, a lighter weight document handler is desirable. It is also desirable that a document registration edge alignment or positioning system be available for such manual copying which is compatible with that used for the document handler.

Although faster, more accurate, and automatic feeding into and registration of each document at the correct position on the platen to be copied is highly desired, this is difficult to accomplish without skewing (rotating) the document and/or damaging the edge of the document, particularly as it is being stopped. One problem is that documents can vary widely in sheet size, weight, thickness, material, condition, humidity, age, etc., Documents may even have curls, wrinkles, tears, "dog-ears", cut-outs, overlays, tape, paste-ups, punched holes, staples, adhesive or slippery areas, or other irregularities. Unlike sets of copy sheets, which generally are all from the same new clean batches and therefore of almost exactly the same condition and size, documents often vary considerably even if they are all of the same "standard" size, (e.g. letter size, legal size, A4, B4, etc.).

In contrast, documents even in the same set may have come from completely different paper batches or have variably changed size with different age or humidity conditions, etc.. Furthermore, the images on documents and their fusing can change the sheet feeding characteristics and these images may be subject to damage in feeding if not properly handled, e.g. smearing of fresh typewriting ink. Yet it is desirable to automatically or semiautomatically rapidly feed, register and copy even a mixture of sizes, types, and conditons of documents without document jams or document damage and with each document correctly and accurately aligned to a desired registration position.

One of the most difficult to achieve features for automatic document handling is the rapid, accurate, reliable, and safe registration of each document at the proper position for copying. Conventionally the document is desirably either center registered or corner registered (depending on the copier) by the document handler automatically at a preset registration position relative to the copier platen. At this registration position two orthogonal edges of the document are aligned with two physical or positional (imaginary) registration lines of the copier platen at which the original document is properly aligned with the copier optics and copy sheet/photoreceptor registration system for correct image transfer of the document image to the photoreceptor and then to the copy sheet. This registration accuracy is desirably consistently within approximately one millimeter. If the document is not properly registered, then undesirable dark borders and/or edge shadow images may appear on the ensuing copy sheet, or information near an edge of the document may be lost, i.e. not copied onto the copy sheet. Document misregistration, especially skewing, can also adversely affect further feeding and/or restacking of the documents.

In preferred types of copying systems the document is registered for copying overlaying a selected portion of full sized (full frame) platen which is at least as large as the largest document to be normally copied automatically. In such systems the document is preferably either scanned or flashed while it is held stationary on the platen in the desired registration position. That is, in these full frame systems the document is preferably registered by being stopped and held during imaging at a preset position over the platen glass which is adjacent one side or edge thereof.

As shown in the art, and further discussed below, document handling systems have been provided with various document transports to move the documents over the copier platen and into registration. Such document platen transports may comprise single or plural transport belts or feed wheels, utilizing frictional, vacuum, or electrostatic sheet driving forces. Various combinations of such transport are known with various registration devices or systems. Preferably the same platen transport sheet feeder is used to drive a document onto and off of the platen before and after copying as well as registering the document.

The cited art shows several approaches to registering a document for copying at an appropriate position relative to the transparent copying window. Typically the document is registered on one axis by driving it with a platen transport against a mechanical gate or stop positioned temporarily or permanently at or adjacent one edge of the platen. This is often at or closely adjacent the downstream edge of the platen. That allows unidirectional movement of the document across the platen, entering from the upstream side or edge closely following the proceeding document and ejecting after copying from the downstream side or edge of the platen. The registration gate or stop may comprise projecting aligned fingers, or roller nips, or a single vertical surface along one registration line, against which an edge of the sheet, preferably the leading edge, is driven into abutment to mechanically stop and thereby register the sheet on one axis, in its principal direction of movement. Another function of such mechanical registration is to also deskew the document, i.e., to properly rotate and align it with this registration line as well as to determine and control its registration position.

As disclosed, for example, in U.S. Pat. Nos. 4,043,665 issued Aug. 23, 1977 to J. R. Caldwell; 4,132,401 issued Jan. 2, 1979 to J. F. Gauranski, et al; or 4,295,737 or 4,391,505 issued Oct. 20, 1981 and July 5, 1983 to Morton Silverberg, document registration can desirably be done without mechanical document stops on the platen. This can be done by preregistering the document to a platen transport belt with upstream, off-platen, preregistration fingers or rollers, and then moving the document a known, preset, distance over the platen on the belt into registration, providing there is no slippage during this entire movement between the document and the belt.

Of particular note is U.S. Pat. No. 4,052,054 to Cardwell et al, (IBM) showing an SADH with a retractable preregistration gate. It is cited again further herein re "two-up" document presentation.

Figure 7:
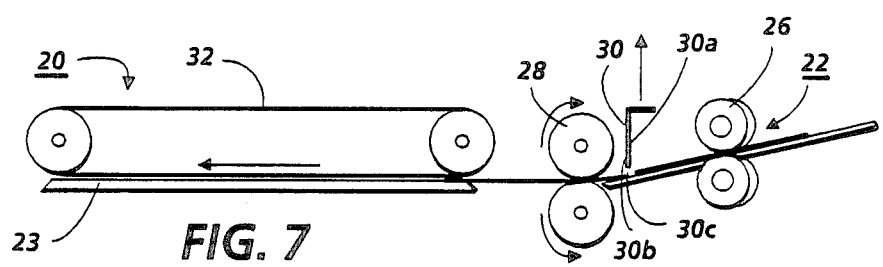

Alternatively, this can be done by sensing, on the platen or upstream of the platen, with a document edge sensor, the edge of a document being transported onto the platen and then stopping the document platen transport then or after a preset time period or movement to stop the document on the platen. Off-platen document edge sensing (see below) is preferred, since reliable on-platen sensing is more difficult and generally requires special sensors and platen transport modifications or adaptations such as disclosed in said U.S. Pat. Nos. 4,391,505 and in 3,473,035 and 3,674,363. Thus, particularly noted is U.S. Pat. No. 3,674,363 to E. O. Baller et al, issued July 4, 1972, e.g. Cols. 8 and 9, second paragraph, and Col. 10, first paragraph, disclosing sensing the document trail edge upstream of the platen to initiate slowdown and stopping of the platen transport. Said U.S. Pat. No. 3,473,035, issued Oct. 14, 1969 to J. F. Gardener, is particularly noted as to SW1 in FIG. 7 and its description re operator selectable document stopping/shifted imaging positions. A recent measured-stop registration system is taught in U.S. Pat. No. 4,579,444 issued Apr. 1, 1986 to T. S. Pinckney and H. J. Sanchez.

The following additional references also apparently sense a document sheet trailing edge as the reference time for initiating a control "count" or fixed distance drive for controlling the document sheet feeding drive on the copier platen; IBM Tech. Discl. Vol. 19, No. 5, Oct. 1976, pp. 1589-1591, and U.S. Pat. Nos. 3,829,083 and 3,936,041, to Shiina et al (Ricoh), and U.S. Pat. No. 4,066,255 issued Jan. 3, 1978 to W. F. Bradbury (Addressograph-Multigraph Corp.).

Especially noted in this regard are Xerox Disclosure Journal publications Vol. 2, No. 3, May/June 1977, p. 49, and Vol. 3, No. 2, March/April 1978, pp. 123-124. The latter teaches lead edge document sensing and document transport reversal, but states that "Trail edge document sensing is not desirable, particularly for an undersized document, where the desired registration edge is at the downstream side of the platen".

U.S. Pat. No. 4,456,237 issued June 26, 1984 to M. H. Buddendeck is cited particularly for its disclosure of an RDH with a solenoid (56) opened document feed roll set (48) nip to provide for optional document reversal by reversible rollers 30 in an RDH document path.

DH registration systems may also utilize multiple belts and documents stopping registration fingers into the document path to stop the document at the desired registration position. Examples are disclosed in U.S. Pat. Nos. 4,589,651 issued May 20, 1986 to M. Silverberg 4,470,591 issued Sept. 11, 1984 to T. Acquaviva; 4,322,160 issued Mar. 30, 1982 to G. S. Kobus; and 3,844,522 issued Oct. 29, 1974 to C. D. Bleau et al. One example of a registration gate movable in and out of the document path from above the platen (from inside the document handler) is disclosed in U.S. Pat. No. 4,256,298 issued Mar. 17, 1981 to D. K. Ahern.

Various other examples of document registration fingers or gates are disclosed in numerous other references such as U.S. Pat. No. 4,456,243 issued June 26, 1984 to P. D. Simone, Xerox Disclosure Journal, Vol. 6, No. 5, September/October, 1981, pp. 239-240; U.S. Pat. No. 4,400,085 issued Aug. 23, 1983 to T. Nezu; U.S. Pat. Nos. 4,330,117 issued May 18, 1982 to G. Weisbach; and 3,072,397 issued Jan. 8, 1983 to H. E. Kelchner.

Examples of U.S. Patents on servo-motor or stepper-motor driven original document feeders in general are U.S. Pat. Nos. 3,888,579; 4,000,943; 4,144,550; 4,283,773 and 4,455,018.

In some document handling systems a system for also side registering (laterally positioning) the document on the platen is used i.e. aligning the original on both axes while on the platen, e.g. U.S. Pat. Nos. 4,411,418 or 4,335,954. However two axes on-platen registration is not required, and such lateral or second axis registration may be done upstream of the platen, as by confinement of the documents within the side guides in the document tray from which the documents are fed, or driving the sheet against a side guide, e.g. U.S. Pat. Nos. 4,257,587; 4,266,762 or 4,381,893.

Of particular interest to the present system are reversible platen transport document trail edge registration systems. Examples of document handling systems in which the document is registered on the platen using a fixed (non-retractable) registration stop against which the document is reverse-driven by a transport are disclosed, for example, in U.S. Pat. Nos. 4,146,220 issued Mar. 27, 1979 to P. Barton; 3,504,908 issued Apr. 7, 1970 to J. R. Kreuger; and 4,033,574 issued July 5, 1977 to K. K. Stange. The use of a fixed stop projecting above the plane of the platen as disclosed in such references has the potential for allowing this same registration edge to be utilized for manual registration of a document as well. However, it has the significant disadvantage that if this registration edge is not retracted the document cannot be readily fed over it by the same transport unless part of the transport is lifted. This conventionally limits the document feeding path for a fixed registration edge document handler to one of two reversing document motion types. In one type the document is fed forward onto the platen over an upstream raised registration edge, and then the document belt is reversed in direction, while it is held down, to drive the rear or trail edge of the document into alignment with this upstream fixed registration edge. Then after copying, the document belt must be reversed again to resume its forward motion to eject the document from the downstream side of the platen. Note, e.g., U.S. Pat. No. 3,504,908 cited above. In the other type, the fixed, permanently raised, registration edge is located at the downstream end of the platen. The document is registered by driving it downstream across the platen into the downstream registration edge. Then, after copying, the document transport is reversed in direction to feed the document back off from the upstream end of the platen. A disadvantage of this type is that since the document is being fed off from the same side of the platen from which it was fed on, only one document at a time can be handled by an over-platen document belt transport. That is, the subsequent document cannot be fed onto the platen until the preceding document is ejected from the platen by the belt. With such a "Y" shaped bidirectional platen transport system the documents cannot be recirculated in a unidirectional endless loop to and from the platen. This normally requires either a longer document changing time or a faster document transport.

For the above reasons, the use of retractable registration edges and normally non-reversing transports has been generally preferred for modern high speed document handling systems. This allows the document to be fed off the platen over the retracted registration member while the next document is being fed on with the same, unidirectional, transport.

Of interest by way of art and background on signature copying of documents for pamphlet or booklet printing on a copier is U.S. Pat. No. 4,334,765 issued June 15, 1982 to G. A. Clark (IBM). (Note that the word "of" should be before "signatures" at Col. 1 line 61.) This patent demonstrates the difficulty and complexity of document signature pair sheet handling. A recirculating document feeder is also briefly generally suggested but not shown. Said U.S. Pat. No. 4,334,765 discloses the preparation of booklets by permitting somewhat simplified operator manipulations of a copier which forms adjacent images from sequential original sheets. An automatic document feeder presents successive original documents from an input stack to the reproduction position. The original documents are initially fed to the copier in a first sequence but are alternate page (not all) imaged. The originals are then re-stacked and are again presented to the reproduction position with previously unimaged originals forming images on different portions of the same copy sheets. A sorter is used to collate the copy sheets. Said U.S. Pat. No. 4,334,765 also states at the beginning of Col. 2 that: "In U.S. Pat. No. 4,188,881, filed July 28, 1977, originals are divided by the operator into two stacks which are used in rotation to prepare a master for double-size copy sheets".

U.S. Pat. No. 4,592,651 issued June 3, 1986 to T. Oikawa, et al (Ricoh) shows a copier with a duplex recirculating document handler and a center-folding book-binder device for the copies. Cols. 14–15 describe some signature copying formulas and Cols. 15–16 describe document copying sequences using immediate duplexing. However, this system does not allow "two-up" copying, which is more efficient, and it requires 4 copying passes for each copy sheet being signatured, and requires immediate duplex document inversion. A similar disclosure is apparently in U.S. Pat. No. 4,640,611 issued Feb. 3, 1987 to E. Ohdake, T. Oikawa, et al (Ricoh).

Said U.S. Pat. No. 4,334,765 the beginning of Col. 2 refers to the "Xerox 7000 Signature Maker" "operator's instructions 610P2625C". It is believed that this refers to a printed cardboard "slide rule" type device provided for several years by Xerox Corporation for assisting the operator in the difficult task of manually reordering the pages of the original document sheets into the reordered page sequences for a proper signature sequence of manual "two-up" document copying to provide signature copies, for a selected number of originals set on this "slide rule" at a corresponding slide-out position. However, the "7000" copier required manual document feeding and placement for "two-up" copying. Thus, it was known as described in the operator's instructions for the Xerox "7000" machine signature maker to manually use a calibrated table and to manually follow the step-by-step instructions for the placement of the correct page order of originals on a platen.

The making of signatures for booklet-making is also described in the 1985 printed operator's manual for the Xerox Corporation "1090" copier at pp. 25–27. A chart providing document page presentation orders is provided. Although this copier has a recirculating document feeder, it is not used for document pairs feeding or signature printing. Signature printing is done by manually reordering and presenting document sheets, as with the "7000" copier as previously described. The Xerox "1090" copier operator manual describes a step-by-step procedure to place documents on the platen with reference to a numbering table. As noted above, utilizing the large (greater than 11×17 inch) size copying capacity of the platen to copy two letter size (8½×11 inch) documents simultaneously placed on the platen together with optical reduction can produce one side of a signature page copy of each document pair.

There is a known form of signature printing in which the "pages" of the "originals" are electronic master images, electronically arranged, rather than normal physical document sheets. The "Xerox" "9700" and "8700" electronic laser printers may be operated with automatic signature printing capabilities, referred to as "signature imposition" and specifically as the "Xerox Integrated Composition System" or "XICX", in commercial use since at least March 1981, as understood. However, this system requires a computer and plural page electronic image storage. It runs software developed several years ago for electronic photocomposition typesetting. This can produce copy sheet output in signature sheets which are correctly "four-up", i.e. 4 pages on each sheet, two on each side, so that, for example, a set of signatures of 8 and one-half by 11 inch standard letter size sheets may be center-folded (once) into a 5 and one-half by 8 and one-half inch booklet. Collated sets of a publication can thus be made with the XICX system on the "9700" printer. This system cannot, of course, directly copy or rearrange conventional document sheets.

As to plural document feeding other than for signature printing, U.S. Pat. No. 4,315,687 issued Feb. 16, 1982 to Breuers et al (Océ-Nederland) and U.S. SIR H21 published Feb. 4, 1986, disclose simultaneously copying plural small original sheets with a mask (form overlay) for providing additional information on the copy sheet. Likewise, a parallel document card stock feeder for a copier is shown in Japanese Application No. 54-164764 filed Dec. 20, 1979 by Ricoh Co., Ltd., laid open July 17, 1981 as No. 56-88064 and Patent No. 56-88155(A).

The concept of manually positioning two regular size documents on the platen for copying simultaneously onto a single large copy sheet (known as "two-up" copying) is disclosed, for example, as early as U.S. Pat. No. 3,402,628 to Redding. Note particularly the paragraph at the beginning of Col. 1. This is not for signature printing. Rather, it is for making plural copies from one copy sheet by subsequently slitting the copy sheet into separate copies. There are various other "two-up" document copying or printing systems in which the purpose and result is likewise to cut the copy sheet in half to make separate copy sheets of each document, not signatures. A further example is U.S. Pat. No. 4,198,881 issued Feb. 19, 1980 to E. C. Bruning (AM International, Inc.).

U.S. Pat. Nos. 3,288,459 issued Nov. 29, 1966 to A. M. Hitchcock at al, 3,326,548 issued June 20, 1967 to G. C. Wright, and 4,052,054 issued Oct. 4, 1977 to W. R. Cardwell et al (IBM), disclose an original document feeder for simultaneously feeding two original documents to be copied simultaneously. The former two illustrate and particularly describe in Col. 3, middle, through Col. 4, a document tray 2 with a reciprocating plate 54 adapted to hold two documents. It places the documents on a moving belt transport 3 for transporting the documents through a downstream scanning station 4. The ejection of the documents is subsequently by that transport belt into a tray 92. However, this is not for signature printing. The latter (Cardwell et al) discloses feeding two documents onto a platen to be copied simultaneously with a single document feeder. Parallel two-up document feeding is also briefly discussed in a January/February 1985 Xerox Disclosure Journal Publication by the inventor, Vol. 10, No. 1, pp. 45–49, at p. 48.

U.S. Pat. No. 4,235,431 issued Nov. 25, 1980 to Abrams et al discloses a machine for transporting documents for copying which maintains a preselected interdocument gap. The documents (e.g., checks) are automatically fed from a stack onto a conveyor apparatus. A pair of rotatable gate members rotates into and out of the path of the conveyor. The gate members interrupt the advancement of the documents and maintain a spacing therebetween.

Japanese laid-open Patent Application No. 60-2942, Jan. 9, 1985 to Isaki, filed June 21, 1983 as No. 58-111389, teaches an apparatus for feeding two originals onto the exposure glass of a copying machine. A first original document is moved, by a system of rollers and dual conveyors, into position upon a platen. Next, a second original document is moved up to near the rear of the first document, using an on-platen stopper so both may be imaged onto a single sheet of paper.

Also noted for applications of the present system are "split scan" systems wherein two document pages are presented to the platen at the same time, but normally in a "split scan" mode one page is copied at a time. Note, for example the 2-up special scanning and/or duplexing systems of Canon U.S. Pat. Nos. 4,017,173 and 4,098,551 issued Apr. 12, 1977 and July 4, 1978 to Komori et al; Canon U.K. No. 1,499,412 published Feb. 1, 1978; Ricoh U.S. Pat. No. 4,218,130 issued Aug. 19, 1980 to Satomi et al; Minolta U.S. Pat. No. 4,453,819 issued June 12, 1984 to Wada et al and Sharp U.S. Pat. No. 4,639,120 issued Jan. 27, 1987 to Matsuura, et al..

Also noted re means for placing more than one original sheet at a time in the imaging station area is U.S. Pat. No. 3,635,555, issued Jan. 18, 1972 to A. Kurahashi, et al (Canon).

Since the exemplary embodiment shown and disclosed herein has utility for use with an integral modular folder/fastener unit for making finished booklets from the collated signature sets output of the copier, further referenced in addition to U.S. Pat. No. 4,592,651, supra, is Xerox Corporation U.S. Pat. No. 4,595,187 issued June 17, 1986 to H. L. Buber (filed July 1985) which discloses an on-line saddle fastening accessory with a roof-shaped compiler and means for saddle-fastening each compiled booklet, for a collated output copier with an RDH. Other signature binders are well known in the printing arts, e.g. U.S. Pat. No. 3,554,531 issued Jan. 12, 1981 and U.S. Pat. No. 4,478,398 issued Oct. 23, 1984 to W. J. Stobb. U.S. Pat. No. 4,416,046 issued Nov. 22, 1983 to R. E. Stokes, discloses a stitcher and indicates in Col. 1, line 9 that it may be used for binding signatures.

A center-folding system is also taught, for example, in U.S. Pat. No. 1,463,879 issued Aug. 7, 1923 to W. Downing. Likewise, in allowed and commonly assigned U.S. application Ser. No. 759,707, filed July 29, 1985 by H. Bober.

The present system is particularly suitable for copiers with a sufficiently large platen area and copy sheet processing path size to accommodate two A4 size document sheets on the platen side-by-side and to allow them both to be copied onto a single large size copy sheet, such as A3 size. That is because a single A3 size copy sheet has the same area as two side-by-side A4 sheets, so that when the A3 sheets are center-folded they can be made into a booklet of 4 pages A4 size if it is signature printed. Also, A3 sheets can be fed short-edge-first through a copier processor designed for long-edge-first feeding of regular copy sheets. An ISO standard A3 sheet is approximately 29.7 cm. by 42 cm. or 11.69"×16.54". An A4 sheet is approximately 21 cm. by 29.7 cm., or 8.27"×11.69", which is close to the U.S. standard "letter size" (8.5"×11" or 21.6×27.9 cm.). See, e.g., U.S. Pat. No. 4,298,277, for the Col. 14 table of standard sheet sizes.

Various copiers can provide large copy sheet copying. The Xerox "1055" copier and the Canon NP-8570 copier, for example, provide both copying and automatic on-line folding of 28 cm. by 43 cm. (11" by 17") copy sheets. [This size of sheets can be signature printed and center-folded into U.S. "letter" page size booklets].

In the description herein the term "document" or "sheet" refers to a usually flimsy sheet of paper, plastic, or other such conventional individual image substrate, and not to microfilm or electronic images which are generally much easier to manipulate. It is important to distinguish electronic copying systems, such as the "9700" noted above, which read and store images of documents electronically and create copies by writing on a photoreceptor with a laser beam, or the like, since they do not have the problems dealt with here.

The "document" here is the sheet (original or previous copy) being copied in the copier onto the outputted "copy sheet", or "copy". Related plural sheets of documents or copies are referred to as a "set". A "simplex" document or copy sheet is one having an image and page on only one side or face of the sheet, whereas a "duplex" document or copy sheet has a "page", and normally an image, on both sides. The "page numbers" are, of course, not necessarily actual numbers printed on the pages. Nor are document sheet numbers referenced herein specific sheets.

The present invention is suitable for either precollation copying, i.e. automatically plurally recirculated document set copying provided by a recirculating document handling system or "RDH"; or nonprecollation, or postcollation, copying, such as semiautomatic document handling (SADH) as discussed above, or almost any automatic document feeder (ADF).

Precollation, collation, recirculative, or RDH copying, as it is variably called, is a known desirable feature for a copier. It provides a number of important known advantages. In such precollation copying any desired number of collated copy sets or books may be made by making a corresponding number of recirculations of the set of documents in collated order past the copier imaging station and copying each document page (normally only once) each time it circulates over the imaging station. The copies therefrom may automatically exit the copier processor in proper order for stacking and offsetting as precollated sets, and thus do not require subsequent collation in a sorter or collator. On-line finishing (stapling, and/or gluing, or other binding and stacking) and/or removal of completed copy sets may thus be provided while further copy sets are being made in further circulations of the same document set.

In the known conventional (nonsignature printing) copy art, as in the normal operation of the Xerox Corporation "1090" copier, it is known to provide a recirculating document handler (RDH) to recirculate document sheets to and from a stack thereof on an automatic duplex copier (and to invert duplex documents) to provide collated duplex copy sheet sets. Automatic on-line finishing thereof as by compiling, stapling, stitching and/or gluing is provided. Some examples of Xerox Corporation U.S. RDH Patents are 4,459,013 issued July 10, 1984 to T. J. Hamlin et al, U.S. Pat. No. 4,278,344 issued July 14, 1981 to R. B. Sahay, and U.S. Pat. Nos. 4,579,444, 4,579,325 or 4,579,326. Some other examples of recirculating document handlers are disclosed in U.S. Pat. Nos. 4,076,408; 4,176,945; 4,428,667; 4,330,197; 4,466,733 and 4,544,148. A preferred vacuum corrugating feeder air knife, and a tray, for an RDH are disclosed in U.S. Pat. Nos. 4,418,905 and 4,462,586. An integral semi-automatic and computer form feeder (SADH/CFF), which may be an integral part of an RDH, as noted in Col. 2, paragraph 2, therein, is disclosed in U.S. Pat. No. 4,462,527. Various others of these patents, such as U.S. Pat. No. 4,176,945 above, issued Dec. 4, 1979 to R. Holzhauser (Kodak) teach plural mode, e.g. RDH/SADH, document handlers. A system for using an RDH to more efficiently copy small document sets of only two documents is taught in U.S. Pat. No. 4,468,114, issued Aug. 28, 1984 to S. Pells, et al (Xerox).

However, a disadvantage of such precollation copying systems is that the documents must all be repeatedly separated and circulated sequentially for copying in a predetermined order a number of times equivalent to the desired number of copy sets. Thus, increased document handling is necessitated for a precollation copying system, as compared to a post collation copying system. Therefore, maximizing document handling automation while minimizing document wear or damage is particularly important in precollation copying.

In contrast, in a postcollation copying system, such as with an ADH or SADH, plural copies may be made at one time from each document page and collated by being placed in separate sorter bins. Thus, the document set need only be circulated (or manually or semiautomatically fed) to the imaging station once if the number of copy sets being made is less than the number of available sorter bins. A disadvantage is that the number of copy sets which can be made in one document set circulation is limited by the number of available sorter bins. Also, a sorter adds space and complexity and is not well suited for on-line finishing. However, postcollation copying, or even manual document placement, is desirable in certain copying situations to minimize document handling, particularly for delicate, valuable, thick or irregular documents, or for a very large number of copy sets. Thus, it is desirable that a document handler for a precollation copying system be compatible with, and alternatively usable for, postcollation and manual copying as well.

The art of original document sheet handling for copiers has been intensively pursued in recent years. Various systems have been provided for automatic or semiautomatic feeding of document sheets to and over the imaging station of the copier for copying. The documents are normally fed over the surface of an imaging station comprising a transparent platen, into a registered copying position on the platen, and then off the platen. Such automatic or semiautomatic document handlers eliminate the need for the operator to place and align each document on the platen by hand. This is a highly desirable feature for copiers. Document handlers can automatically feed documents as fast as they can be copied, which cannot be done manually with higher speed copiers, thus enabling the full utilization or productivity of higher speed copiers.

The present invention overcomes various of the above-discussed problems of plural document copying registration for copiers, and provides various of the above features and advantages.

A feature of the specific embodiment disclosed herein is to provide a method and apparatus for an automatic document handling system for a copier, with means for sequentially feeding and registering document sheets to the imaging station of the copier for their copying, including a retractable registration gate with means for retractably inserting said registration gate into the document sheet feeding path for engaging an edge of the document sheet fed thereagainst so as to register the document sheet; the improvement wherein:

said registration gate has first and second opposite registration sides spaced apart by a preset defined distance;

said means for feeding and registering document sheets includes means for registering the first edges of the document sheets against said first side of the registration gate while said registration gate is inserted into the document sheet feeding path;

said means for feeding and registering document sheets further including means for reversing the direction of motion of automatically preselected sequential document sheets to back the opposite edges of said preselected document sheets into registration with said second, opposite, side of said registration gate in coordination with reinserting of said registration gate into the document path and also registering a first edge of another document sheet against said first side of the registration gate;

and said means for feeding and registering document sheets further including means for feeding at least two said document sheets to the imaging station together, with one document sheet following the other, while said registration gate is retracted for copying of these document sheets with a registered spacing between those document sheets which is determined by and corresponds to said preset defined distance between said first and second opposite sides of said registration gate.

Further features provided by the system disclosed herein, individually or in combination, include:

image erasure means associated with said copier for automatically preventing copying in said registered spacing between said document sheets; and/or wherein said system is actuated only in response to input means selection of automatic "two-up" copying, and wherein if said selection is not actuated, the document sheets are all fed directly to said imaging station for individual copying thereof without said reversal.

There is also disclosed herein the feature of a method of automatic document handling for a copier, for feeding and registering document sheets to the imaging station of the copier for their copying, utilizing a retractable registration gate retractably insertable into the document sheet feeding path for engaging an edge of the document sheet to register the document sheet; the improvement comprising the steps of:

registering a first edge of a first document sheet against a first side of the registration gate while said registration gate is inserted into the document sheet feeding path;

retracting said registration gate;

feeding said first document sheet past said registration gate;

reinserting said registration gate into the document sheet feeding path;

reversing the direction of motion of said first document sheet to back a second, opposite, edge of said first document sheet into registration with the second, opposite, side of said registration gate;

registering a first edge of a second document sheet against said first side of the registration gate;

re-retracting said registration gate;

and feeding, with one following the other, both of said first and second document sheets to the imaging station for copying of both said first and second document sheets with a registered spacing between said second edge of said first document sheet and said first edge of said second document sheet which is determined by and corresponds to the thickness of said registration gate between said first and second sides of said registration gate.

There is further disclosed the step of automatically preventing copying in said registered spacing between said second edge of said first document sheet and said first edge of said second document sheet; and wherein said method is actuated only in response to a selection of automatic "two-up" copying, and wherein if said selection step does not occur, said first document sheet is fed directly to said imaging station for individual copying thereof after said first step of registering a first edge of a first document sheet against said first side of said same registration gate, without said other steps; and wherein said reversing step and said second edge registration step are automatically repeated for alternate sequential document sheets to automatically present a series of adjacent pairs of closely spaced document sheets to said imaging station;

wherein said reversing step and said second edge registration steps are repeated for registering plural document sheets in closely spaced groups of three or more on the imaging station at one time for copying them onto single copy sheets; and wherein said document sheets are sequentially and linearly fed long edge first (that is, fed in the movement direction of their smallest dimensions) for copying in adjacent pairs at said imaging station onto a single copy sheet for each pair of document sheets.

Some examples of various other prior art copiers with document handlers, and especially with control systems therefor, including document sheet detecting switches, etc., are disclosed in U.S. Pat. Nos.: 4,054,380; 4,062,061; 4,076,408; 4,078,787; 4,099,860; 4,125,325; 4,132,401; 4,144,550; 4,158,500; 4,176,945; 4,179,215; 4,229,101; 4,278,344; 4,284,270, and 4,475,156. It is well known in this art, and in general, how to program and execute document handler and copier control functions and logic with conventional or simple software instructions for conventional microprocessors. This is taught by the above and other patents and various commercial copiers. Such software may vary depending on the particular function and particular microprocessor or microcomputer system utilized, of course, but will be available to or readily programmable by those skilled in the applicable arts without experimentation from either descriptions or prior knowledge of the desired functions together with general knowledge in the general software and computer arts. It is also known that conventional or specified document handling functions and controls may be alternatively conventionally provided utilizing various other known or suitable logic or switching systems.

All references cited in this specification, and their references, are incorporated by reference herein where appropriate for appropriate teachings of additional or alternative details, features, and/or technical background.

Figure 2:
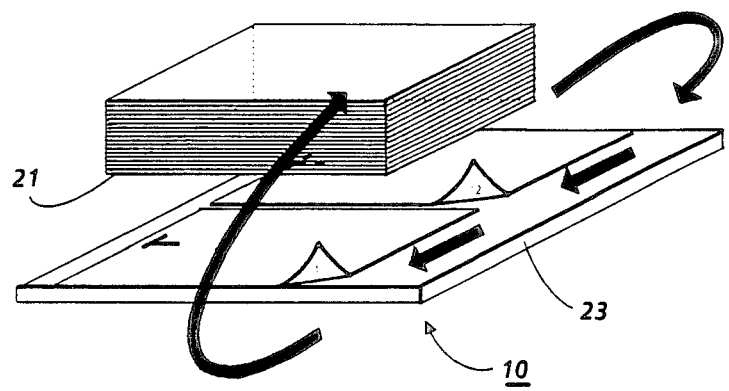

Various of the above-mentioned and further features and advantages will be apparent from the specific apparatus and its operation described in the example below. The present invention will be better understood by reference to this description of this embodiment thereof, including the drawing figures (approximately to scale), wherein:

FIG. 1 is a side view of an exemplary document handler for a copier, incorporating the system of the invention (in this example, a simplex/duplex dual mode RDH/SADH, shown being used with a conventional document);

FIG. 2 is a schematic illustration of the exemplary mode or path of presenting documents to the platen, i.e., sequentially, long-edge-first, from one stack in pairs but one-after-another to the front or back of the platen, or from one side thereof; and FIG. 3-8 schematically illustrate the exemplary process steps, by illustrating in similar side views the different exemplary positions of the document pairs registration and feeding system of the invention.

Describing now in further detail the specific example illustrated in the Figures, there is shown a copier 10 with a document handling system 20, (preferably an RDH to be described herein) both somewhat similar in part to that disclosed in the above-cited U.S. Pat. No. 4,469,319 and other patents referenced, but specifically modified and adapted for document pair feeding as described herein, for sequentially transporting pairs (or triplets, etc.) of preregistered and prespaced document sheets onto and over the conventional platen imaging station 23 of the copier 10, for copying.

The document handling (DH) system 20 illustrated in FIG. 1 is exemplary, and may be readily modified for different copiers. It has two separate document inputs, a recirculating or RDH input stacking tray 21 on top, and an SADH side entrance 22 for semiautomatic document handling, especially for larger documents, which may be optionally inserted short edge first there, or undersize documents. This document handling system 20 here is particularly adapted to automatically feed and register pairs of document sheets at the appropriate registration (copying) position on the platen 23, and to repeatedly recirculate them in pairs, without disturbing their page order.

Other than the DH 20 document pair input system and controls and other features to be described herein, the exemplary copier 10 may be the well known "Xerox" "1075" or "1090" or any other xerographic copier, as illustrated and described in patents cited above, including U.S. Pat. No. 4,278,344 and others. The exemplary copier 10 may conventionally include a xerographic photoreceptor belt 12 and the conventional xerographic stations acting thereon for respectively charging, image exposing at 14, image developing, etc.. Documents on the platen 23 are imaged onto the photoreceptor 12 at 14 through a variable reduction ratio optical imaging system 16 to fit the document images to the selected size of copy sheets. The copier 10 is adapted to provide duplex or simplex precollated or postcollated copy sets from either duplex or simplex original documents copied from the same RDH 20.

The control of all sheet feeding is, conventionally, by the machine controller 100. The controller 100 is preferably a known programmable microprocessor, exemplified by the previously cited art. The controller 100 conventionally controls all of the machine steps and functions described herein including the operation of the document feeder 20, the document and copy sheet gates, the feeder drives, etc.. As further taught in those references, the controller 100 also conventionally provides for storage and comparison of the counts of the copy sheets, the number of documents recirculated in a document set, the desired number of copy sets and other selections by the operator through the panel of switches thereon, time delays, jam correction control, etc..

Referring further to the exemplary plural mode document handling system 20 illustrated in FIG. 1, it may be seen that input documents may be fed to the same input or preregistration gate 30 from either the SADH input 22 or from the RDH tray 21 through an RDH input path 24. The gate 30 may have any of the various specific configurations and operating mechanisms illustrated in various of the above-noted prior art references on registration gate systems. It is retractable in and out of the document path preferably by solenoid actuation controlled by the controller 100. It is positioned at the common or intersecting point of input of the RDH input 24 and the SADH input 22, as illustrated in FIG. 1. The SADH input 22 includes slightly skewed cross-rollers 26 which, as taught in the above-cited U.S. Pat. No. 4,579,444 provides side edge registration as well as feeding of the document forward for registration and deskewing against the gate 30. Such rollers may also be provided in the RDH input path 24. Just downstream of the gate 30 are take-away or on-platen rollers 28 providing a document sheet feeding nip for engaging and transporting any portion of the document sheet which is past the gate 30. As will be discussed further in connection with the schematic illustration of operating steps in FIGS. 3–8, these particular rollers 28 are preferably reversible. They feed the documents directly into the platen transport system 32, which preferably comprises one or more belts for engaging and transporting the documents without slippage over the platen 23 into the desired registration position. As will also be further discussed with regard to FIGS. 3–8, the platen transport system 32 is also preferably reversible here, and both it and the rollers 28 may be servo motor driven by the controller 100 in a manner taught by various of the above-cited references.

After the documents are copied on the platen 23, they are, in this system, ejected into downstream or off-platen rollers 34 and onto a decision gate 36. If the gate 36 is up it deflects the documents to a document output or ejector including output rollers 38 and sensor 39. If the decision gate 36 is down, documents are deflected into an RDH return path 40. However, this RDH return path 40 includes reversible rollers 42 to provide a choice of two return paths to the RDH tray 21; a simplex return path 44 with inversion, or a duplex return path 46 without inversion. The duplex return path 46 provides desired inversion of duplex documents in the tray 21 for a subsequent circulation or circulations, described in the above-cited art. This inversion is when the duplex document has had only one inversion per circulation, only in the RDH input path 24. In contrast, in the simplex return path there are two inversions per circulation, which equals no inversion, because the total recirculation path includes one inversion in each of the paths 24 and 44.

It will be noted that the respective document paths include various sensors for sensing the lead edge and/or trail edge of the document sheets, schematically illustrated in FIG. 1 by the conventional representation of an arrowhead or triangle. All of these sensors are, of course, conventionally connected to the controller 100 to be utilized in the operation of the DH system 20.

As illustrated, the RDH tray 21 includes a variable position rear registration edge or backstop, illustrated here with several dashed lines, for initially accommodating and restacking various sizes of documents. The illustrated DH system 20 utilizes for its RDH feeding a known combined corrugated vacuum feeding and air knife separator system for feeding out sequentially the bottom-most sheet of the stack in the tray 21, as described in various of the above-cited references.

Further referring to FIG. 1, there is also illustrated one example of a system 52 for not copying, or erasing, the space between documents being copied on platen 23. The example illustrated here utilizes a narrow band lamp or plural lamp light source 50 actuated by the controller 100 at the appropriate timing. When utilized with a known transparent or semi-transparent photoreceptor belt 12, this lamp 50 may be utilized under the belt 12 to rear-expose and discharge a narrow band of the belt 12. Lamp 50 is positioned or timed so that the area of the photoreceptor 12 which it discharges coincides with what otherwise would be an image area of exposure between the two documents on the platen, as illustrated in FIG. 1. This prevents any possible exposure of either contaminants on the transport belt exposed between the two documents, or edge shadows from the two adjacent edges of the documents, from being imaged onto a copy sheet. It will be appreciated that the lamp 50 may actually be a plural mode lamp which also provides normal lead edge, rear edge, and/or interdocument or pitch fadeout, which erase lamp is briefly actuated to provide this additional function as a part of the present system. Various suitable prior art erase lamp systems are known in the art, and several are collected in, for example, pending U.S. application Ser. No. 908,052, filed Sept. 16, 1986 by the same inventor and assignee.

FIG. 2 schematically illustrates one document sheet path for the DH system 20 of FIG. 1, operating in the RDH mode for signature pair copying, as further described in the cross-referenced copending U.S. application Ser. No. 944,693, filed Dec. 18, 1986 by Richard E. Smith and the same assignee FIG. 2 illustrates that what is being accomplished here is sequential, not simultaneous, document pairs feeding, thus enabling the feeding from a conventional, single stack of documents or other input rather than requiring two separate parallel stacks of documents for feeding, with a double feeder, as is normally practiced. As noted, the present invention is desirable for, and usable with, signature printing (as described in said Smith application and references cited therein but is not limited thereto).

Figure 3:
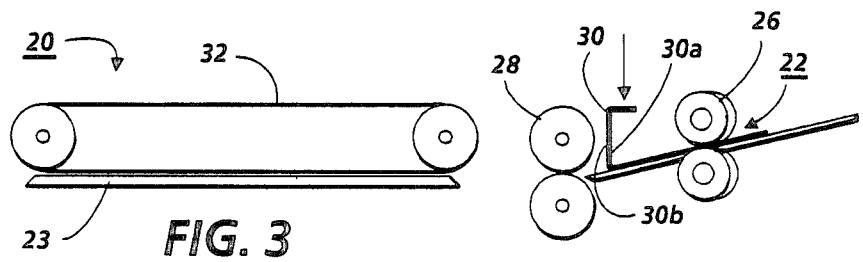
Figure 8:
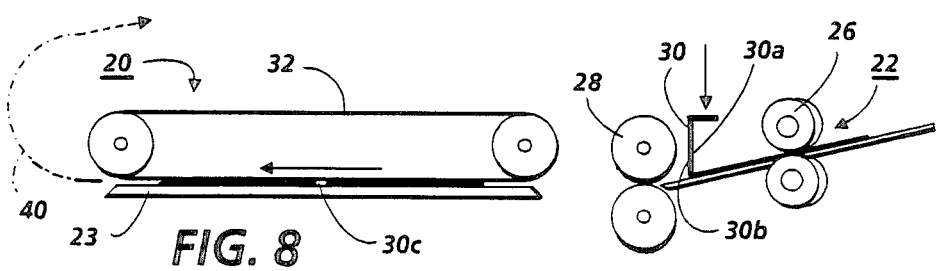

Referring now to FIGS. 3–8, these are exemplary schematic figures all illustrating the same exemplary mechanism in different positions of operation, to clearly illustrate one example of the process steps which may be utilized for the present system. For clarity, only the SADH input cross-rollers 26 are illustratd, but it will be appreciated that this same system may operate in the same manner for the RDH input path 24, utilizing the rollers in that path in that alternative mode of operation. The document handling system 20 for copier 10 is adapted for sequentially spacing, feeding and registering exemplary document sheets to the imaging station 23. The gate 30 is retractably insertable into the document feeding path to engage and register an edge of the document fed thereagainst (FIG. 3). Here, the registration gate 30 has first and second registration sides 30a and 30b spaced apart by a preset defined distance 30c. This corresponds to the gate 30 thickness. The first or leading edges of the documents are registered against side 30a of the registration gate while the gate 30 is inserted into the document feeding path (FIG. 3). The document feeding and registering system then lifts the gate 30 and feeds the first document past the gate 30 (FIG. 4) and then reverses the direction of motion of selected documents here (FIG. 5) to back their opposite or trailing edges into registration with the opposite (second) side 30b of the gate (FIG. 6) in coordination with reinserting the gate into the document path (FIG. 6) and in coordination with also registering a first edge of the next-fed document against the first side 30a of the gate (FIG. 6), and then the gate 30 is re-retracted (FIG. 7) and those two documents both are fed to the imaging station 23 (FIG. 7) for "two-up" copying (FIG. 8) with a registered spacing 30c between them determined by the thickness of the gate, and then ejected (FIG. 8). As previously noted, a system may also be provided to prevent copying of the small spaces between the paired documents.

Figure 4:
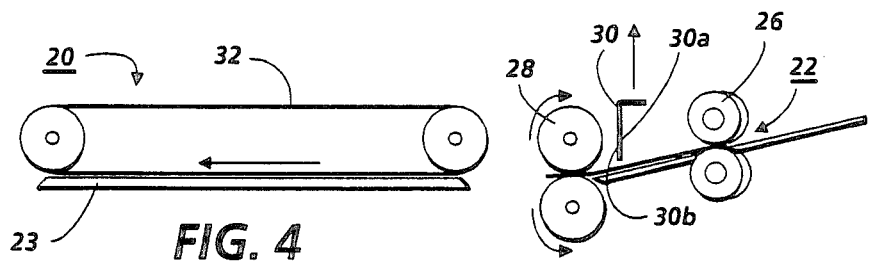
Figure 5:
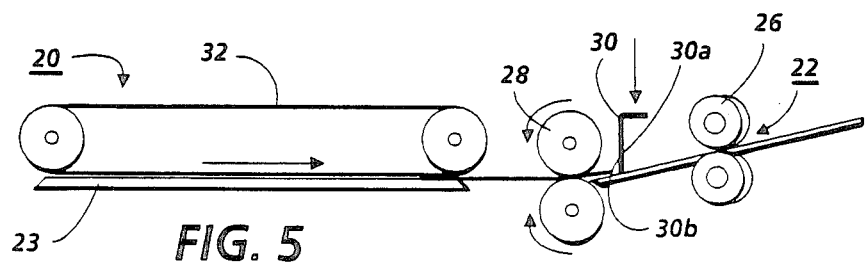
Figure 6:
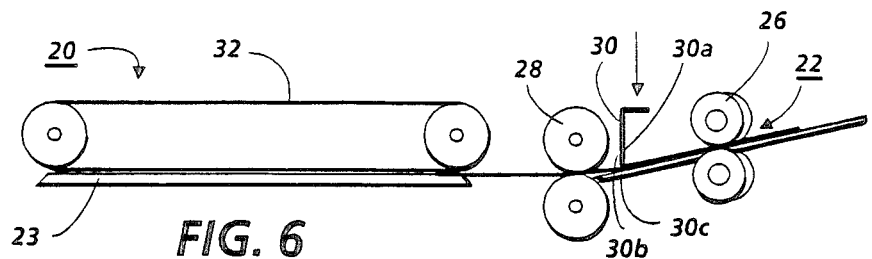

To resummarize the operating steps as illustrated in FIGS. 3–8, the operator loads the first document against the preregistration gate 30 at the conventional input, here the SADH input loading tray, as in FIG. 3. Upon the command of the controller 100, controlled by the input sensors, the gate 30 is raised and this first document sheet advances towards, but not completely onto, the platen 23, as shown in FIGS. 4–5. Under the control of the appropriate illustrated paper path sensors and the servo motor drive, the trail edge of the first original stop just beyond the gate 30, as shown in FIG. 5. After a slight delay, the gate 30 is dropped back into the document path and the document is backed up by a few millimeters until its trail edge reaches the back side of the gate 30, as illustrated in FIG. 6. The operator or the automatic document feeder, whichever is being utilized, now feeds the second original sheet against the front surface 30a of the gate 30, as shown in FIG. 6. Upon another sensor and timing control command from the controller 100, the gate 30 is raised again and both document sheets now advance to the desired registration position on the platen, where they may be imaged, for example onto a single large copy sheet. No manual spacing or manual positioning is required. All the steps are fully automatic.

Desirably, this is a dual mode system which automatically provides normal document feeding and registration if this special, but simple and low cost, plural-document-on-platen copying mode is not selected by a switch or touch selection by the operator on the copier control console or panel for the controller 100.

While there is illustrated here in FIGS. 3–8 the steps of the operation for "two-up" copying of only one pair at a time of document sheets, it will be appreciated that the present system can also be utilized for closely spacing and group copying three or more documents commonly, using the same system with only a slight operational variation. For example, for copying three documents at once, the reversing step of FIG. 5 would be repeated after FIG. 8 so that the rear edge of the second document is also registered to the incoming third document, and then all three would be fed onto the platen for copying. That is all of the documents of the group would be rear-registered to the rear surface 30b of the gate 30 except for the final document in the group to be copied as a group.

The number of documents to be spaced and copied as a group will, of course, vary depending on how small the documents are and how large the platen 23 is for the particular copier. It may also vary depending on whether the particular copier platen has its longest dimension in the feeding direction of the documents by the document handling unit, or vice versa, or, alternatively, whether the document feeder is one which feeds the documents onto and over the platen from one side thereof or from the top or bottom ends thereof, or whether the document sheets are being fed long-edge-first or short-edge-first (landscape or portrait).

It will be appreciated that the spacing between documents which is provided by the distance between the first and second registration sides of the dual mode registration gate 30 may be easily preset and changed by changing the gate thickness, or placing spacing elements thereon. Likewise it will be appreciated that this thickness or dimension is coordinated with the image erasing dimensions provided by the interdocument erase system 52. While the final gap or spacing between the documents at the imaging position is primarily determined by the thickness of the gate fingers, it may also be affected or varied by a speed mismatch between the platen transport 32 and the rollers 28.

Note that all of the various desirable features variously described above may be accomplished by relatively simple software changes in the controller 100 and a choice in the operator display or buttons, with minimal cost hardware changes in the document handler itself.

While the embodiment disclosed herein is preferred, it will be appreciated from this teaching that various alternatives, modifications, variations or improvements therein may be made by those skilled in the art, which are intended to be encompassed by the following claims.

What is claimed is:

1. In an automatic document handling system for a copier, with means for sequentially feeding and registering document sheets to the imaging station of the copier for their copying, including a retractable registration gate with means for retractably inserting said registration gate into the document sheet feeding path for engaging an edge of the document sheet fed thereagainst so as to register the document sheet; the improvement wherein:

said registration gate has first and second opposite registration sides spaced apart by a preset defined distance;

said means for feeding and registering document sheets includes means for registering the first edges of the document sheets against said first side of the registration gate while said registration gate is inserted into the document sheet feeding path;

said means for feeding and registering document sheets further including means for reversing the direction of motion of automatically preselected sequential document sheets to back the opposite edges of said preselected document sheets into registration with said second, opposite, side of said registration gate in coordination with reinserting of said registration gate into the document path and also registering a first edge of another document sheet against said first side of the registration gate;

and said means for feeding and registering document sheets further including means for feeding at least two said document sheets to the imaging station together, with one document sheet following the other, while said registration gate is retracted, for copying of these document sheets with a registered spacing between those document sheets which is determined by and corresponds to said preset defined distance between said first and second opposite sides of said registration gate.

2. The automatic document handling system of claim 1, further including image erasure means associated with said copier for automatically preventing copying in said registered spacing between said document sheets.

3. The automatic document handling system of claim 1, wherein said system is actuated only in response to input means selection of automatic "two-up" copying, and wherein if said selection is not actuated, the document sheets are all fed directly to said imaging station for individual copying thereof without said reversal.

4. In a method of automatic document handling for a copier, for feeding and registering document sheets to the imaging station of the copier for their copying, utilizing a retractable registration gate retractably insertable into the document sheet feeding path for engaging an edge of the document sheet to register the document sheet; the improvement comprising the steps of:

registering a first edge of a first document sheet against a first side of the registration gate while said registration gate is inserted into the document sheet feeding path;

retracting said registration gate;

feeding said first document sheet past said registration gate;
reinserting said registration gate into the document sheet feeding path;
reversing the direction of motion of said first document sheet to back a second, opposite, edge of said first document sheet into registration with the second, opposite, side of said registration gate;
registering a first edge of a second document sheet against said first side of the registration gate;
re-retracting said registration gate;
and feeding, with one following the other, both of said first and second document sheets to the imaging station for copying of both said first and second document sheets with a registered spacing between said second edge of said first document sheet and said first edge of said second document sheet which is determined by and corresponds to the thickness of said registration gate between said first and second sides of said registration gate.

5. The method of automatic document handling for feeding and registering document sheets of claim 4, further including the step of automatically preventing copying in said registered spacing between said second edge of said first document sheet and said first edge of said second document sheet.

6. The method of automatic document handling for feeding and registering document sheets of claim 4, wherein said method is actuated only in response to a selection of automatic "two-up" copying, and wherein if said selection step does not occur, said first document sheet is fed directly to said imaging station for individual copying thereof after said first step of registering a first edge of a first document sheet against said first side of said same registration gate, without said other steps.

7. The method of automatic document handling for feeding and registering document sheets of claim 4, wherein said reversing step and said second edge registration step are automatically repeated for alternate sequential document sheets to automatically present a series of adjacent pairs of closely spaced document sheets to said imaging station.

8. The method of automatic document handling for feeding and registering document sheets of claim 4, wherein said reversing step and said second edge registration steps are repeated for registering plural document sheets in closely spaced groups of three or more on the imaging station at one time for copying them onto single copy sheets.

9. The method of automatic document handling for feeding and registering document sheets of claim 4, wherein said document sheets are sequentially and linearly fed long edge first (that is, fed in the movement direction of their smallest dimensions) for copying in adjacent pairs at said imaging station onto a single copy sheet for each pair of document sheets.

* * * * *